T. H. PICKERING.
VEGETABLE PEELER.
APPLICATION FILED SEPT. 14, 1921.
1,424,032.
Patented July 25, 1922.
6 SHEETS—SHEET 1.
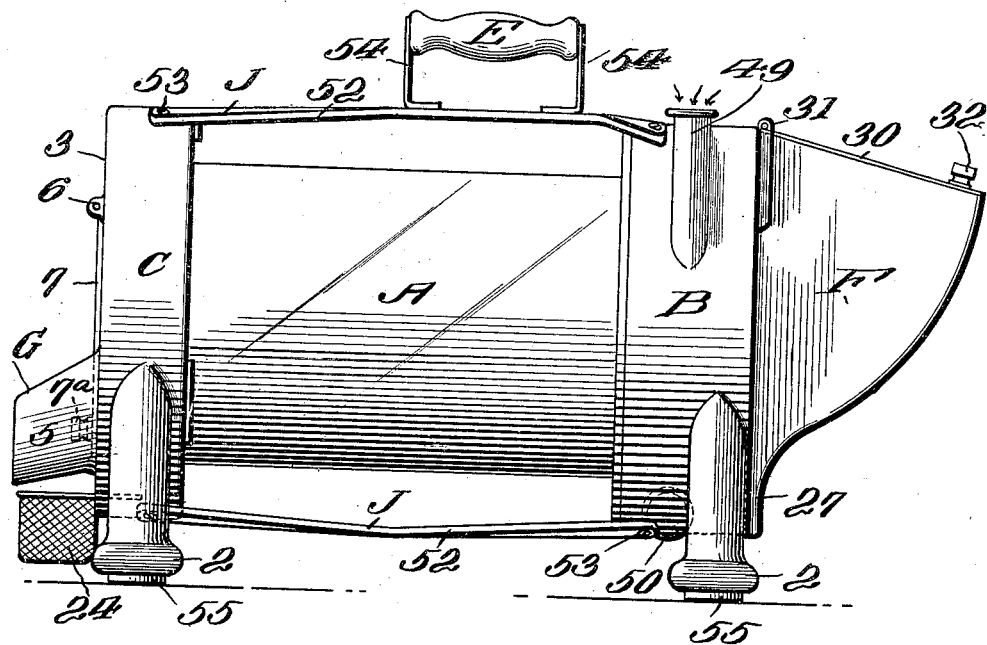
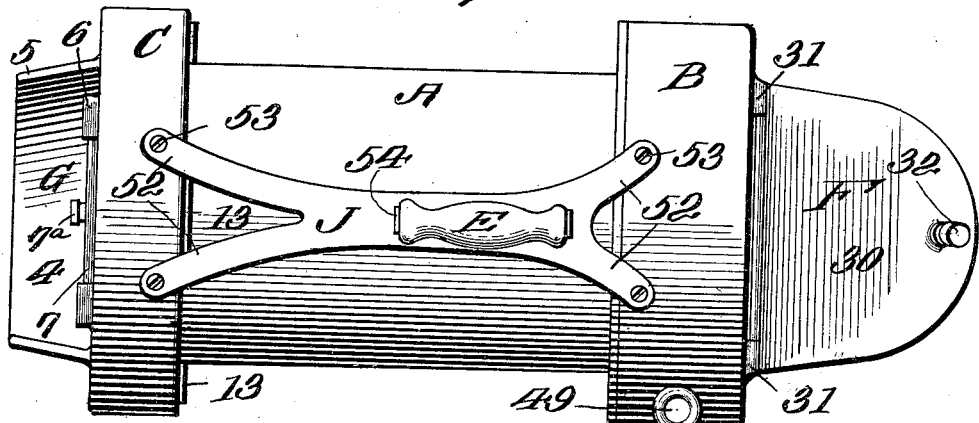
Inventor
T. H. Pickering
By A. S. Pattison
Attorney

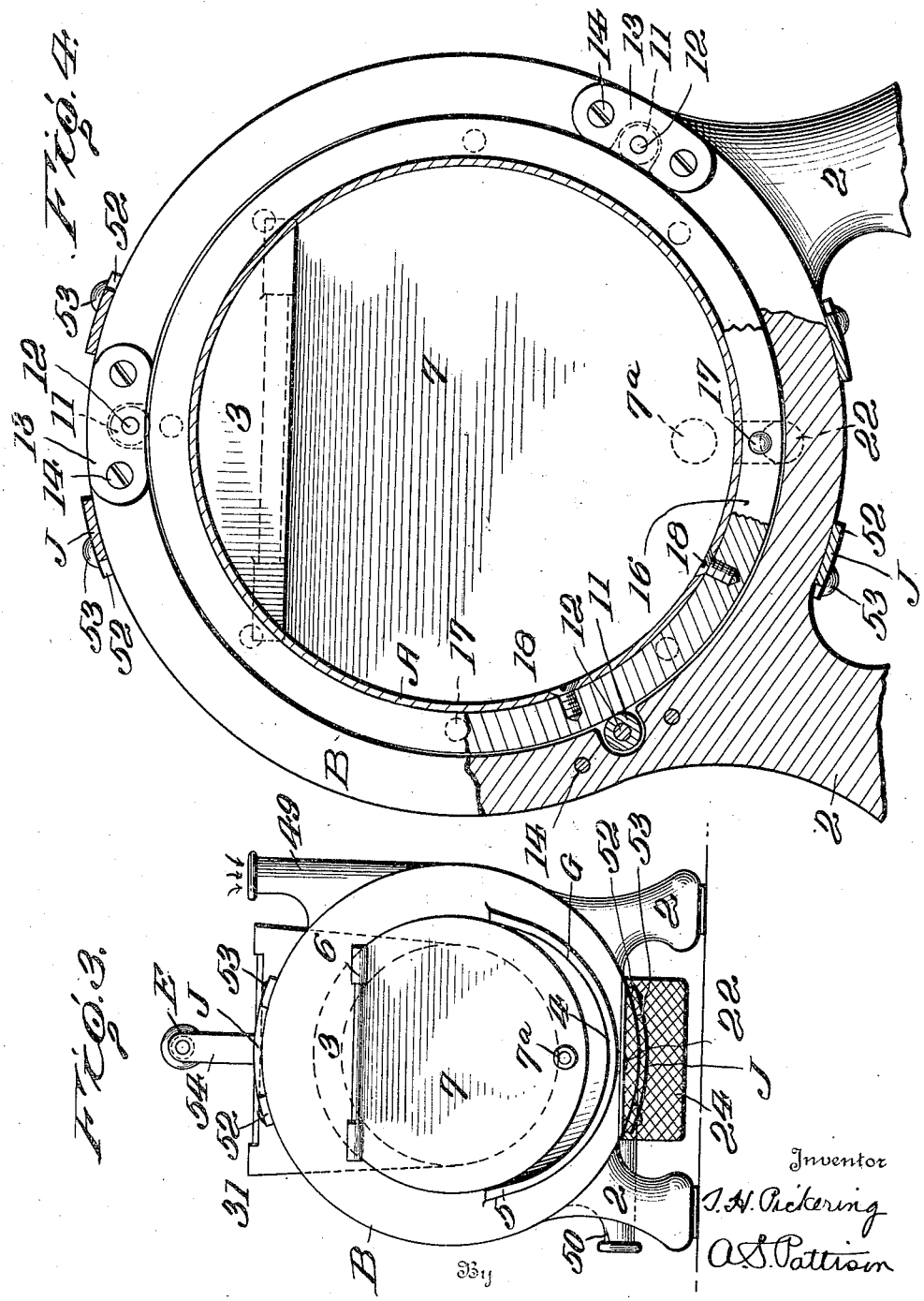

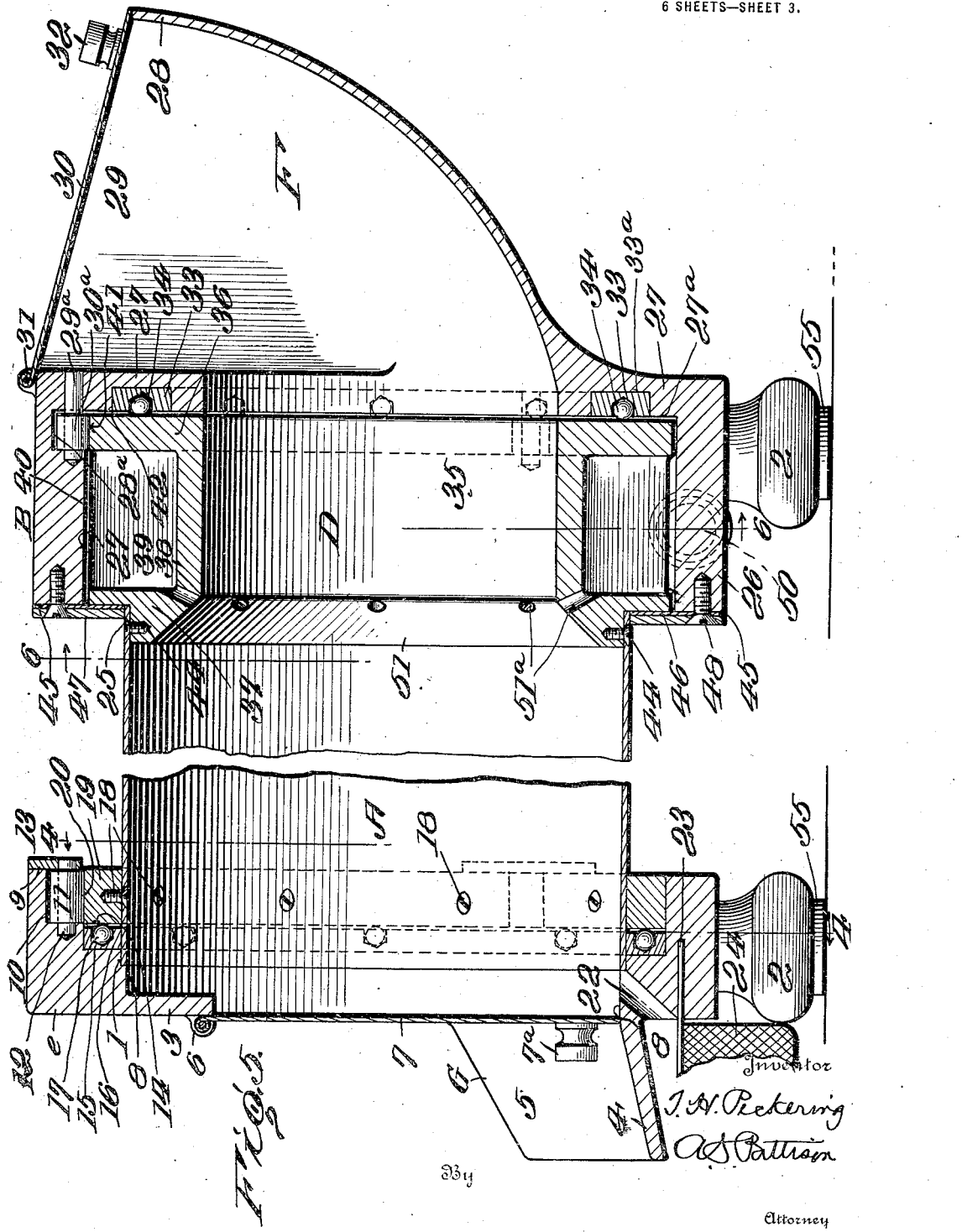

T. H. PICKERING.
VEGETABLE PEELER.
APPLICATION FILED SEPT. 14, 1921.

1,424,032.

Patented July 25, 1922.

Inventor
T. H. Pickering
By A. S. Pattison,
Attorney

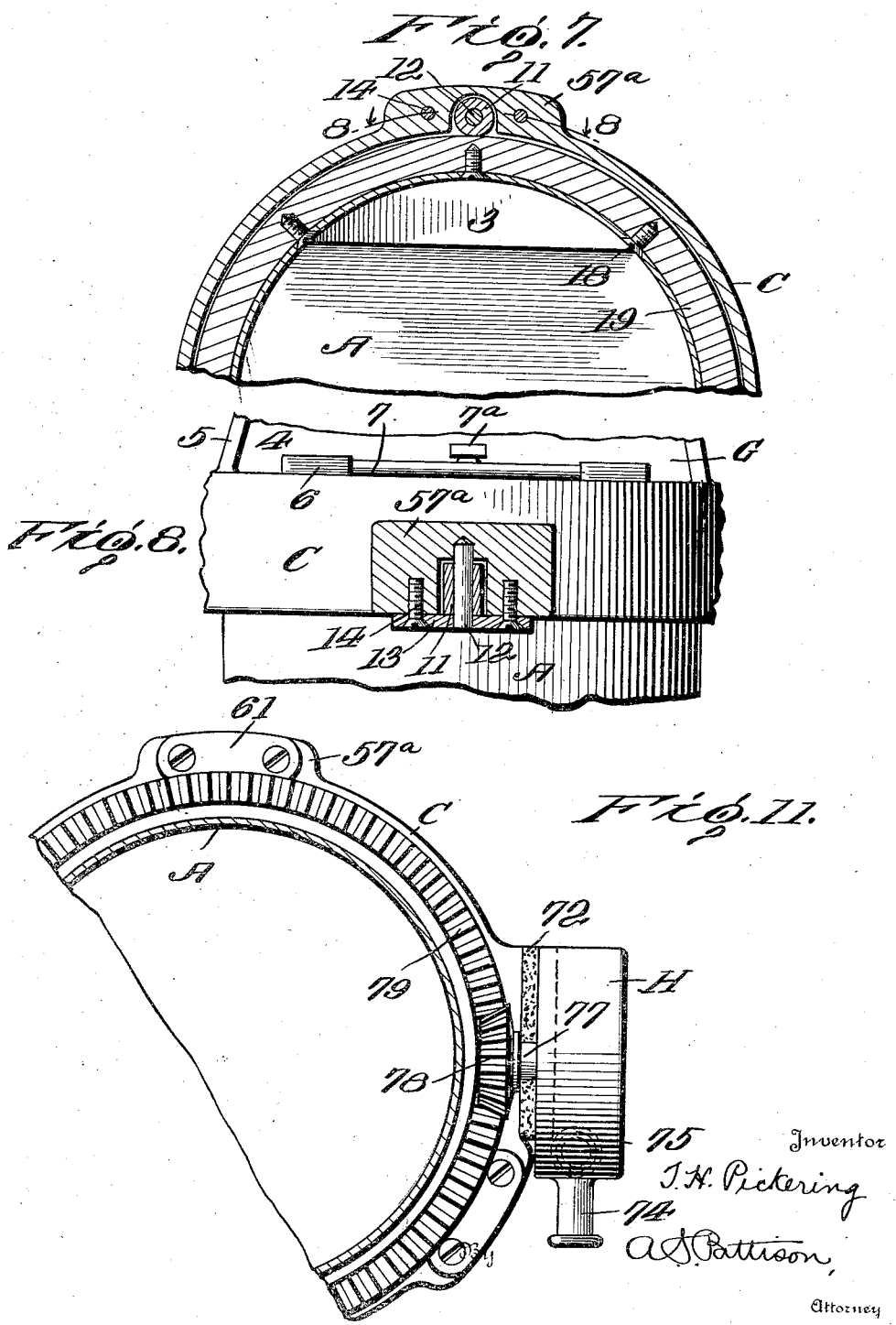

T. H. PICKERING.
VEGETABLE PEELER.
APPLICATION FILED SEPT. 14, 1921.
1,424,032.
Patented July 25, 1922.
6 SHEETS—SHEET 6.
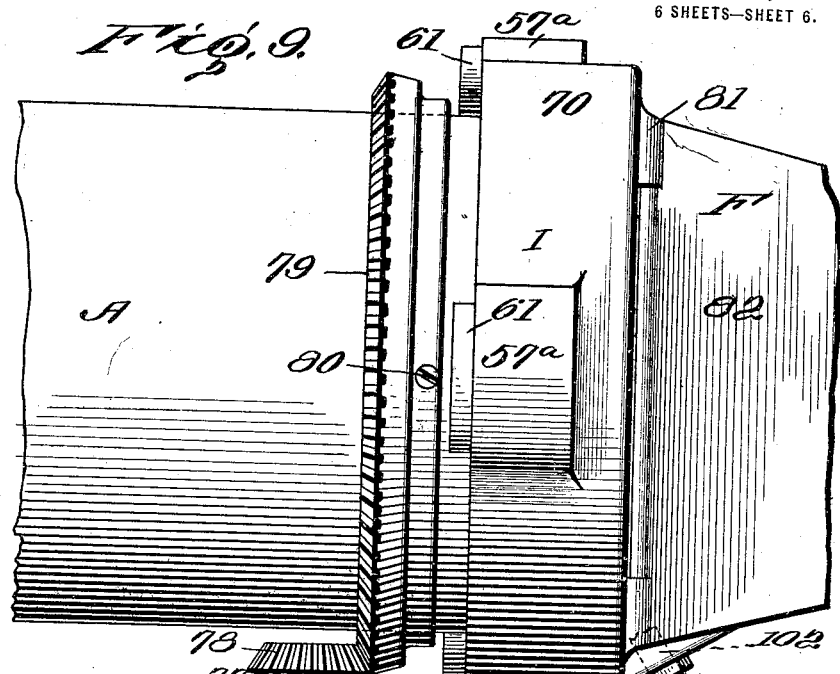
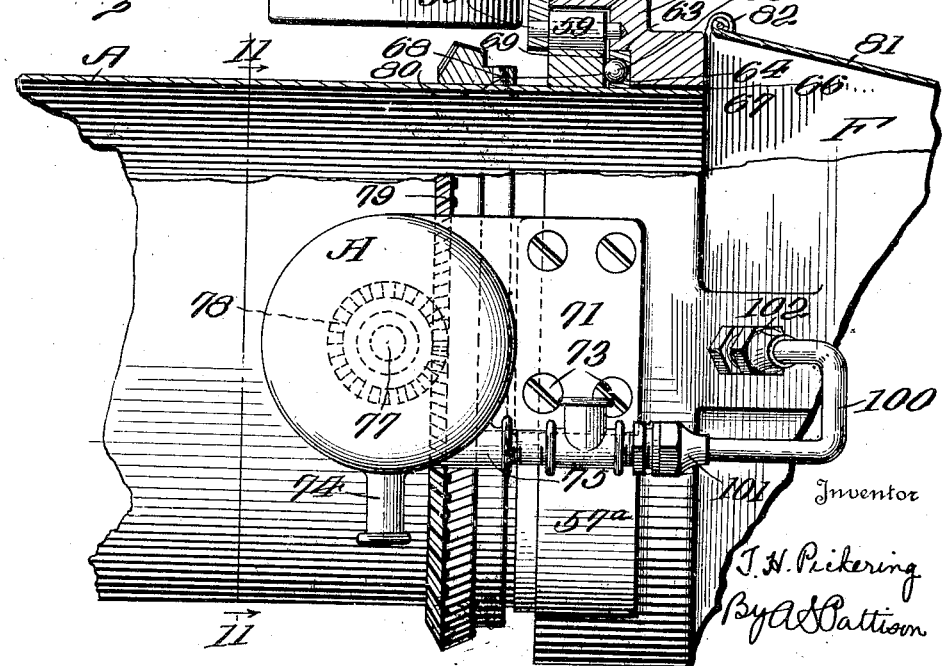
Inventor
T. H. Pickering
By A. S. Pattison
Attorney

UNITED STATES PATENT OFFICE.

THEODORE H. PICKERING, OF ROCHESTER, NEW YORK, ASSIGNOR TO JOSIAH ANSTICE & COMPANY, INC., OF ROCHESTER, NEW YORK, A CORPORATION OF NEW YORK.

VEGETABLE PEELER.

1,424,032.

Specification of Letters Patent.  Patented July 25, 1922.

Application filed September 14, 1921. Serial No. 500,547.

*To all whom it may concern:*

Be it known that I, THEODORE H. PICKERING, a citizen of the United States, residing at Rochester, in the county of Monroe and State of New York, have invented certain new and useful Improvements in Vegetable Peelers, of which the following is a specification, reference being had therein to the accompanying drawing.

This invention relates to improvements in vegetable peelers, and more particularly to a water-driven vegetable peeler, which is small in size and suitable for household and family use.

The particular design and mode of operation of my improved vegetable peeler will be hereinafter described, but the device consists broadly (in its preferred form) of an open ended cylinder having an inner abrading surface rotatably supported between two end castings. One of the end castings carries a water inlet and an impelling or driving wheel operatively connected to the cylinder for rotating the same, while the opposite end casting is provided with an opening for removing the vegetables and the vegetable peelings from the cylinder. The vegetables are introduced into the cylinder through the end casting carrying the driving wheel, and the peeler is further provided with a handle for lifting it about, while both end castings carry legs for supporting the peeler.

The primary object of my invention is to provide a fluid driven vegetable peeler which is efficient in operation and cheap of manufacture.

A further object of my improved invention is to provide a vegetable peeler which removes the vegetable skin in such a manner that a very small proportion of the vegetable matter is lost in the removal or the peeling of the skin.

A further object of my improved invention is to provide a fluid driven vegetable peeler adapted for and suitable to household or family, hotel or factory use.

Other and further objects and improved results of my invention will appear in the following description and the accompanying drawings, in which—

Figure 1 is a side view of a vegetable peeler made in accordance with my improved invention.

Fig. 2 is a top plan view of my improved vegetable peeler.

Fig. 3 is an end view of my improved vegetable peeler, showing the end through which the vegetables are removed.

Fig. 4 is a transverse vertical sectional view taken on the line 4—4 of Fig. 5, looking in the direction indicated by arrow.

Fig. 5 is a longitudinal vertical sectional view taken through the device, as shown in Fig. 1.

Fig. 7 is a transverse vertical sectional view showing the bearing for supporting the cylinder in the modified form where the turbine driving means is used.

Fig. 8 is a sectional view taken on the line 8—8 of Fig. 7, looking in the direction indicated by arrow.

Fig. 9 is a top plan view of one end of my improved vegetable peeler, showing a modified form of driving means, consisting of a turbine in geared engagement with the cylinder.

Fig. 10 is a side view of my improved peeler, showing the application of the turbine, a portion of the figure being broken away in longitudinal vertical section and showing the bearing construction for supporting the cylinder.

Fig. 11 is a fragmental transverse vertical sectional view, taken on the line 11—11 of Fig. 10, looking in the direction indicated by arrow.

Figure 6:
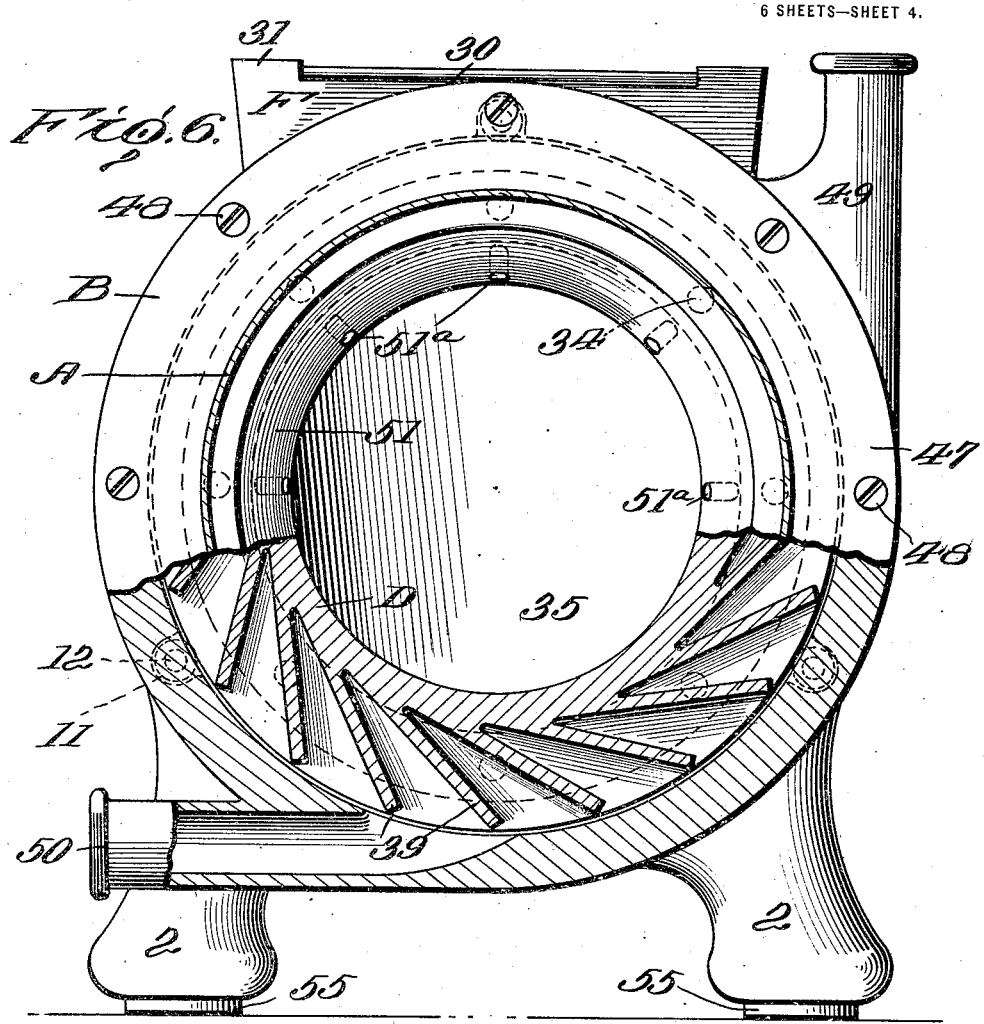
Fig. 6 is a transverse vertical sectional view taken on the line 6—6 of Fig. 5, looking in the direction indicated by arrow.
Figure 12:
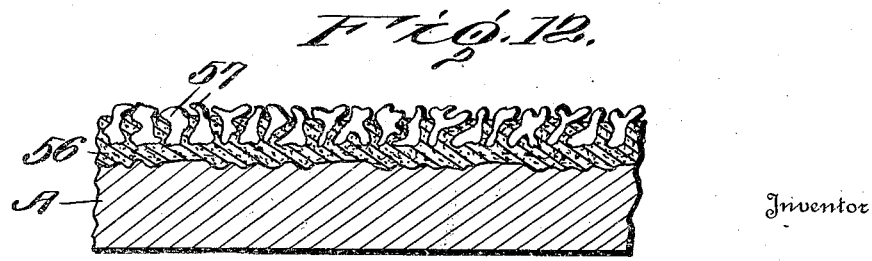
Fig. 12 is an enlarged fragmental sectional view taken through a portion of the cylinder, showing the inner abrading surface of the cylinder.

Referring now to the drawings in which like parts are designated by similar reference numerals throughout the description, and more particularly to Figs. 1, to 6, inclusive, and Fig. 12, show the preferred form of my invention, A designates a hollow open ended cylinder, which is rotatably supported in the housings B and C, which housings are further connected one to the other by means of the stays or connecting bracing members J, which connecting bracing members carry the handle E to facilitate lifting or carrying the device about. The end housing B is provided at its outer side with a vegetable receiving box or trough F, while the end housing C is provided with a vegetable outlet trough G. The rotation of the cylinder A is accomplished through the medium of the impeller-wheel D, which is carried in the end housing B.

Referring now to Figs. 7 to 11, inclusive, which figures show a modified form of my invention, I have likewise the cylinder A, the end housing C, the vegetable receiving trough or box F, and the vegetable outlet trough G. In place of the end housing B, I have substituted the end-housing I and made the addition of the turbine H, which is supported by a bracket on the end of the housing I, and drives the cylinder A through a gearing.

Having made a general description of the preferred and modified forms of my invention, I will now describe in detail the several elements composing my invention.

The hollow open ended cylinder A, has its end 1 supported in the end housing or casting C, which casting broadly comprises a ring, on the outer side of which are cast, or otherwise suitably fastened, the legs 2, while the front face of the housing C has a downwardly extending portion 3, which is carried by the top edge of the housing C and closes to a small degree the opening through the housing. The lower front face of the housing C is provided with an outwardly and downwardly extending trough 4, which has upwardly extending side walls 5. Pivotally mounted in the lugs 6, carried by the downwardly extending portion 3, of the housing C, is a door 7, which closes the remainder of the opening through the housing C, which lies between the lower edge of the downwardly extending portion 3, and the inner lower peripheral edge or face 8 of the housing. The door 7 is provided with a handle 7a for swinging the same on its pivotal mounting, and the door 7 has a circular contour, as clearly appears in Fig. 3 of the drawings, which is necessary to close the opening in the housing C.

The rear edge or face 9, of the housing C, is provided with a peripheral depression or flange 10, in which is carried a plurality of rollers 11, upon stub-shafts 12, the inner ends of which are carried by and suitably fastened in the housing C, while the outer ends of the shafts are supported in the member 13, which are fastened to the rear edge or face 9 of the housing C, by suitable means, such as the screw bolts 14. Below and to the front of the peripheral flange 10 in the housing C is another peripheral flange or depression 15, in the inner periphery of the housing C, and in this flange 15 is carried a ball bearing race 16, which carries a plurality of balls 17.

The end 1, of the cylinder A, carries by suitable means such as the screw-bolt 18 a ring 19, preferably of bronze. The outer periphery 20, of the ring 19, is in engagement with the rollers 11 of the housing, while the inner face 21 of the ring is in engagement with the balls 17 of the ball bearing race 15, carried by the housing. By this construction, as clearly appears in Figs. 4 and 5 of the drawings, the end 1 of the cylinder A is rotatably supported in the housing C in a manner to cause as little friction as possible.

As clearly appears in Fig. 5 of the drawings, the end 1 of the cylinder A, ends short of the downwardly extending portion 3 of the housing C, leaving the portion 8 of the inner periphery of the ring which extends to the outer face of the housing. Extending downwardly and outwardly at an angle through this portion 8 of the inner periphery of the housing C, at a point behind the trough 4, is an opening 22 and supported below and in front of this opening 22 and below the trough 4, by means of its inwardly extending handle-portion 23, is a basket 24.

The housing or end casting B, which supports the opposite end 25 of the cylinder A, comprises broadly a ring. The outer peripheral edge 26 of the housing B carries legs 2, cast integrally therewith, but it will be readily understood that if it were desired, these legs could be fastened to the housing in some other suitable manner. Extending upwardly and outwardly in a curved or bulged manner from the lower outer face 27 of the housing B, is what I have termed a trough or bin F. The upper edge 28 of this trough ends in a plane slightly below the top portion of the outer peripheral edge 26 of the housing B, and at a suitable distance from the housing B, which thereby makes the opening 29 between it and the housing. This opening is closed by means of a door 30, pivotally mounted in the lugs 31, carried by the edge 26 of the housing and is provided with the usual operating handle or knob 32.

As clearly appears in Fig. 5 of the drawings, the outer face 27 of the housing extends the entire circumference thereof and in reality forms an outer flange to the housing, and in its preferable form, as shown, is cast integrally with the housing. In the inner peripheral edge 28 of the housing B is a peripheral flange or depression $28^a$, in which is mounted upon a stub-shaft 29, which spans this depressed flange or groove and has its opposite ends supported in the housing, a plurality of rollers $30^a$. The outer face or flange 27 of the housing has provided at its inner face $27^a$ a depressed peripheral flange or groove $33^a$, in which is pressed a ball bearing race 33 carrying a plurality of balls 34.

The impeller wheel D comprises a hollow wheel which is approximately U-shaped in cross-section, as shown in Fig. 5, and has a central opening 35 therethrough. The U of the wheel is formed by the two upwardly extending walls 36 and 37, connected by the bottom of the U 38, all of which are preferably cast integral. Spanning the U and extending upwardly from its bottom 38, at an angle thereto at a plurality of points throughout its circumference, are the impeller blades 39, which are likewise preferably cast integral with the entire wheel D as shown. It will be readily understood that the impeller blades, if desired, could be otherwise suitably fastened in the wheel.

The impeller wheel D is made of a size so that its diameter is less than the inner diameter of the housing B, and, therefore, there exists a space 40 between the impeller wheel and the inner peripheral edge of the housing. The rollers 30 extend slightly into the space 40 and the upper edge 41 of the wall 36 of the impeller wheel D is supported upon and in roller engagement with these rollers. The outer face 42 of the wall 36 of the impeller wheel is in roller engagements with the balls 34 of the ball bearing race 33. From this it will be readily seen that the impeller wheel D is rotatably supported in the housing B in a manner to cause the slightest possible fraction. The impeller wheel D is provided at its inner edge 43 with a shoulder 44 upon which shoulder rests the end 25 of the cylinder A and is fastened there by means of screw-bolts 44ª, or in some other suitable or like manner. The inner peripheral face 45 of the housing B is provided with a suitable packing 46 and a washer 47. The packing 46 and washer 47 completely encircle the cylinder A, and their lower ends are in engagement with the outer face of the cylinder, while their upper ends are fastened to the inner face 45 of the housing B, by means of screw-bolts 48, or by some other suitable or like means.

The housing B is provided with a water inlet pipe opening 49 near its top, which is adapted to be connected to a water-supply (not shown) and is further provided in its bottom with a water-outlet opening 50. Although I have not shown a manner of leading off the water after it has gone through my device, it will be readily understood that a hose connection could be made to the end of the outlet pipe or opening 50 and the water carried to any desired place.

Referring again to the impeller wheel D, it will be noted that a plurality of downwardly and inwardly slanting openings 51ª are provided in the bottom 38 of the wheel, at the point where it joins its upwardly extending wall 37. These openings extend through the bottom and side wall 37 of the wheel coming out in the beveled lower edge 51 of the wall 37 and these openings allow a small amount of water to enter the cylinder A and mix with the vegetables which are being peeled, thereby thoroughly and constantly washing the contents thereof, and aiding the operation of the device.

To add rigidity to the device, I have provided stays or bracing rods J, which have their ends 52 fastened to the housings B and C, by means of screw-bolts 53, or in some other suitable or like manner. Welded or in some other manner suitably fastened to the bracing rods J, are two L-shaped uprights 54, carrying between them the handle E, to facilitate the transportation of the device to the desired place for use.

As the device will have a tendency to walk when it is in operation, I have provided the legs 2 with rubber or leather feet 55.

In Fig. 12 I have shown the preferred manner of providing an abrading surface for the inner wall of the cylinder A. This abrading surface is made preferably in accordance with the specification of my pending application, Serial No. 454,638. This method of making or applying the abrading surface consists of coating the cylinder with a bakelite solution 56, and embedding the abrading material, preferably small particles of flint 57 or the like therein. A more detailed description of the particular method employed in applying the abrading surface is given in my pending application above referred to. As the manner of applying the abrading material to the cylinder forms no particular part of this invention and could be applied in any of the well-known manners, I will not here go into a greater detailed description of this point.

Coming now to the modified form of my invention, the device is very similar to the preferred form and I use likewise in this form the cylinder A, the housing C, the trough or bin F, and the trough G.

I desire to point out the fact that the housing C, as used in the modified form, differs from the housing C of the preferred form, in that the rollers 11 are carried in a boss 57 which is struck up from the housing. This is done to lighten the device and, as clearly appears in Fig. 7, the thickness of the housing is considerably less in the modified form, using the boss construction, than in the preferred form.

As clearly appears in the drawings, the same construction of the roller 11, shaft 12 and the member 13, fastened in place by the screw-bolts 14, is used, as is likewise the door 7, having the handle 7ª, carried pivotally in the lugs 6. The cylinder A is similarly carried in the housing C in this form, as in the preferred form.

In place of the housing B of the preferred form, I have substituted the housing I. The housing I has provided in its inner periphery a depressed flange 58, in which is carried a plurality of rollers 59 on the shaft 60. One end of the shafts is suitably fastened in the housing I, while the opposite ends of the shafts are supported by the members 61, carried by the inner face 62 of the housing.

Below and to the back of the flange 58 is a flange 63, formed in the housing I, and in this flange is pressed a ball bearing race 64, which carries a plurality of balls 65. The housing I in reality is a ring which has an opening 66 therethrough, and into this opening extends the end 67 of the cylinder A.

Pressed upon and completely surrounding the cylinder A is a ring 68, preferably of bronze. The ring 63 is positioned upon the cylinder A so that its outer periphery is supported upon and in rolling engagement with the rollers 59 of the housing, while its outer edge 69 is in engagement with the balls 65 of the ball bearing race 64. From this it will be seen that the cylinder A is rotatably supported within the housing I, in such a manner as to lessen to the greatest possible degree all friction.

Carried upon the outer face 7, of the housing I, by a bracket 71, under which is a suitable packing 72 and which is held to the housing by suitable means, such as screw-bolts 73, is a turbine H.

The turbine H is provided with a water-inlet 75 and a water-outlet 74, and, as is usual, an impeller wheel 76 mounted on a shaft 77.

On the inner end of the shaft 77 is suitably mounted a gear-wheel 78, which is in engagement with a gear ring 79, which is pressed upon and carried by the cylinder A. To insure the ring gear 79 against rotation upon the cylinder A, I have further provided a plurality of screw-bolt fastenings 80.

The housing I, like the housing B, is provided with the trough or bin F, carrying a door 81, pivotally mounted as at 82 upon the housing. Water is introduced into the cylinder in this form of my invention by means of the pipe 100, one end 101 of which is in communication with the water-inlet to the turbine and the other end 102 of the pipe is in communication with the trough or bin F.

The operation of the preferred form of my device is as follows:

The door 30 is lifted and the vegetables to be peeled are dumped into the trough or bin F, down which they roll through the opening 35 in the impeller wheel D and into the cylinder A. The water is then turned on through the inlet pipe or opening 49 and strikes the blades 39 of the impeller wheel, causing them to rotate. The greater portion of the water finds its way out through the outlet pipe or opening 50, but a small amount of water finds its way through the opening 51 of the impeller wheel into the cylinder A. As the impeller wheel D rotates upon the rollers 30, it rotates with it the cylinder A, which is rigidly fastened to the wheel by means of the screw-bolts 44. As the cylinder rotates, the abrading members 57 of the cylinder wear and scrape away the skin of the vegetables and the water that has found its way into the cylinder works forward out through the opening 22 in the housing C carrying with it a large proportion of the skins which have been removed from the vegetables. The skins will fall into and be retained in the wire basket 24, while the water will continue on through the basket and out through a drain which will be provided for the purpose. When the vegetables in the cylinder have been completely peeled, the water supply will be turned off and the vegetables removed by lifting the door 7 and scraping them out through the trough 4, or, if desired, the door can be opened while the cylinder is still in motion and the vegetables or fruit will soon find its way to the trough and into a receiver which might be placed beneath this trough. When it is desired to clean the cylinder, the same can be readily flushed by turning water into the device without putting the vegetables into the cylinder, or the device can be flushed out by introducing water through either of the doors 30 or 7.

The operation of the modified form of my invention is practically the same with the exception that the water is introduced into the turbine H, which causes the gear 78 to rotate and through the engagement with the ring-gear 79 of the cylinder A the cylinder is caused to rotate. In the modified form the vegetables are introduced into the cylinder and removed therefrom in a similar manner as in the preferred form. In the modified form water is introduced into the cylinder with the vegetables through the pipe 100 into the trough or bin F.

From the foregoing it will be seen that I have provided a vegetable peeler suitable for families or household use, which is simple, cheap and easy of operation and which accomplishes in a quick and efficient manner the peeling of vegetables or fruit.

Although throughout the drawing and description I have shown and spoken of a water-driven device, it will be understood that other motive power, such as electricity could be used, without departing from the spirit of my invention. In fact many small detailed mechanical changes could be made and incorporated which would not, in any way, change the device as disclosed by me.

Having thus described my invention, what I claim and desire to secure by Letters Patent is:

1. In a device of the character described, a supporting frame, a hollow abrading cylinder, the abrading cylinder horizontally rotatably supported within the supporting frame which forms end closures therefor, and a driving means in operative connection with the cylinder for rotating it.

2. In a device of the character described, a supporting frame, a hollow abrading member rotatably supported in the frame and having its ends closed thereby, and a driving means operatively connected with the abrading member.

3. In a device of the character described, a supporting frame, a hollow abrading cylinder rotatably supported in the frame and having its ends closed thereby, and a driving means in operative connection with the cylinder.

4. In a device of the character described, a supporting frame, a hollow abrading cylinder rotatably supported therein, a hollow impeller wheel carried by one end of the frame, and an operative connection between the impeller wheel and the cylinder.

5. In a device of the character described, a supporting frame comprising two hollow ring members, a hollow abrading cylinder rotatably supported in the ring members, a driving means carried by one of the ring members, and an operative connection between the driving member and the cylinder.

6. In a device of the character described, a supporting frame comprising two hollow ring members, an abrading cylinder rotatably supported in the ring members, a hollow impeller wheel rotatably supported in one of the ring members, an operative connection between the impeller wheel and the cylinder, and means for driving the impeller wheel.

7. In a device of the character described, a supporting frame comprising two hollow ring members, an open ended abrading cylinder supported within the ring members, a hollow impeller wheel rotatably supported within one of the ring members and in operative connection with the cylinder, whereby the device is provided with an opening from end to end.

8. In a device of the character described, a supporting frame comprising two hollow rings, an open ended abrading cylinder rotatably supported within the rings, a hollow impeller wheel rotatably supported within one of the ring members, a trough in communication with the hollow impeller wheel, an operative connection between the impeller wheel and the cylinder, an outlet trough in communication at the opposite end of the cylinder, and means for driving the impeller wheel, for the purpose described.

9. In a device of the character described, a supporting frame comprising two hollow ring members, an open ended abrading cylinder rotatably supported in the ring members, one of the ring members provided with water inlet and outlet openings and rotatably carrying an impeller wheel, the impeller wheel operatively connected to the cylinder and provided with water-escape openings into the same, and means for introducing articles through the hollow impeller wheel into the cylinder, for the purpose described.

10. In a device of the character described, a supporting frame comprising two hollow rings, rollers and ball-bearings carried by the rings, a hollow impeller wheel rotatably supported upon the rollers and balls of one ring, an open ended abrading cylinder having one end rotatably supported by the rollers and balls of one ring and its opposite end operatively connected and supported by the impeller wheel, water inlet and outlet openings in the supporting ring carrying the impeller wheel, and water-escape openings from the impeller wheel into the cylinder, for the purpose described.

11. In a device of the character described, a supporting frame comprising two hollow rings, an abrading cylinder rotatably supported within the rings, a hollow driving wheel rotatably supported within one of the rings and in operative connection with the cylinder, and means for closing the outer open ends of the supporting ring.

12. In a device of the character described, a supporting frame comprising two hollow rings, an open ended abrading cylinder supported within the rings, a hollow driving wheel rotatably supported in one of the rings and in operative connection with the cylinder, water inlet and outlet openings in the supporting ring carrying the driving wheel, the driving wheel provided with water escape openings into the cylinder, and the other and opposite end supporting ring provided with a water outlet opening for the cylinder.

13. In a device of the character described, a supporting frame, a rotating peeling member, a water operated member connected with the peeling member, and a housing surrounding the water-operated member, said housing having inlet and outlet openings.

14. In a device of the character described, a horizontally arranged supporting frame, a horizontal cylinder rotatably supported within the frame, a water actuated impeller wheel rotatably supported within one end of the frame and extending into the horizontal cylinder, and a housing surrounding the water actuated impeller wheel, for the purpose described.

15. In a device of the character described, a horizontally arranged cylinder having one end rotatably supported within a housing and its opposite end supported upon a water actuated member, and the water actuated member rotatably supported within a housing having water inlet and outlet openings, for the purpose described.

16. In a device of the character described, a horizontally arranged supporting frame, a horizontal cylinder rotatably supported within the frame, a water actuated member connected to one end of the cylinder, and a housing surrounding the water actuated member.

17. In a device of the character described, a horizontally arranged supporting frame, a horizontal cylinder rotatably supported in the frame, a water actuated member connected to one end of the peeling member, and a housing surrounding the water actuated member, the housing having inlet and outlet water openings.

18. In a device of the character described, a horizontally supported rotatable peeling cylinder having open ends, and a water-actuated member surrounding the opening at one end of the cylinder.

19. In a device of the character described, a horizontally supported rotatable peeling cylinder having a receiving opening at one end, and a water-actuated member connected to the cylinder and surrounding the inlet opening.

20. In a device of the character described, a supporting frame, and an abrading member rotatably supported therein, an impeller wheel carried within one end of the frame and entirely surrounded thereby to form a housing, and an operative connection between the impeller wheel and the cylinder.

21. In a device of the character described, a supporting frame comprising two ring members, a hollow abrading member rotatably supported in the ring members, a driving means carried within one of the ring members between its outer end and the adjacent end of the cylinder, and an operative connection between the driving member and the cylinder.

22. In a device of the character described, a supporting frame, a rotating peeling member, a water operated member connected with the peeling member, and a housing surrounding the water operated member.

23. In a device of the character described, a horizontally arranged supporting frame, a horizontal cylinder rotatably supported in the frame, a water actuated member connected to one end of the peeling member, and a housing surrounding the water actuated member.

24. In a device of the character described, a horizontally supported rotatable peeling cylinder having open ends, and a water actuated member carried adjacent the opening at one end of the cylinder.

25. In a device of the character described, a horizontally supported rotatable peeling cylinder having a receiving opening at one end, and a water actuated member having water inlet and outlet and escape openings connected to the cylinder at its receiving end.

In testimony whereof I hereunto affix my my signature.

THEODORE H. PICKERING.